United States Patent

[11] 3,568,072

| [72] | Inventor | Harvey J. Rosener<br>Torrance, Calif. |
|---|---|---|
| [21] | Appl. No. | 739,421 |
| [22] | Filed | June 24, 1968 |
| [45] | Patented | Mar. 2, 1971 |
| [73] | Assignee | Hughes Aircraft Company<br>Culver City, Calif. |

[54] MACHINE TOOL CONTROL SYSTEM
7 Claims, 8 Drawing Figs.

[52] U.S. Cl............................................... 328/71,
328/41, 328/72, 328/147, 328/183, 318/571
[51] Int. Cl............................................................ H03k 17/02
[50] Field of Search............................................ 318/20,
110, 138; 328/37, 46, 48, 71, 72, 41, 147, 183

[56] References Cited
UNITED STATES PATENTS
3,109,974 11/1963 Hallmark..................... 318/20.110

| 3,110,865 | 11/1963 | Scuitto................... | 318/20.110 |
| 3,241,017 | 3/1966 | Madsen et al............. | 328/48X |
| 3,435,314 | 3/1969 | Bradley et al............ | 318/20.110X |
| 3,458,786 | 7/1969 | Thompson................ | 318/138X |

Primary Examiner—John S. Heyman
Attorneys—James K. Haskell and Earnest F. Oberheim

ABSTRACT: A machine tool control system for producing a pulse train for controlling a servo in an axis of a machine tool, in which an adjustable voltage-to-time period converter is used to control a time period-to-pulse converter for producing the pulse train. Two counters are employed for controlling enabling of an output gate. One counter is driven by pulses at the system clock rate, about 4 megacycles, and the other counter is driven by pulses at a frequency of about one thirty-fourth of the clock rate. Logic circuits controlled by the voltage-to-time period converter control the gating of the different frequency pulses to the respective counters. The lower frequency pulses only are gated by the output gate.

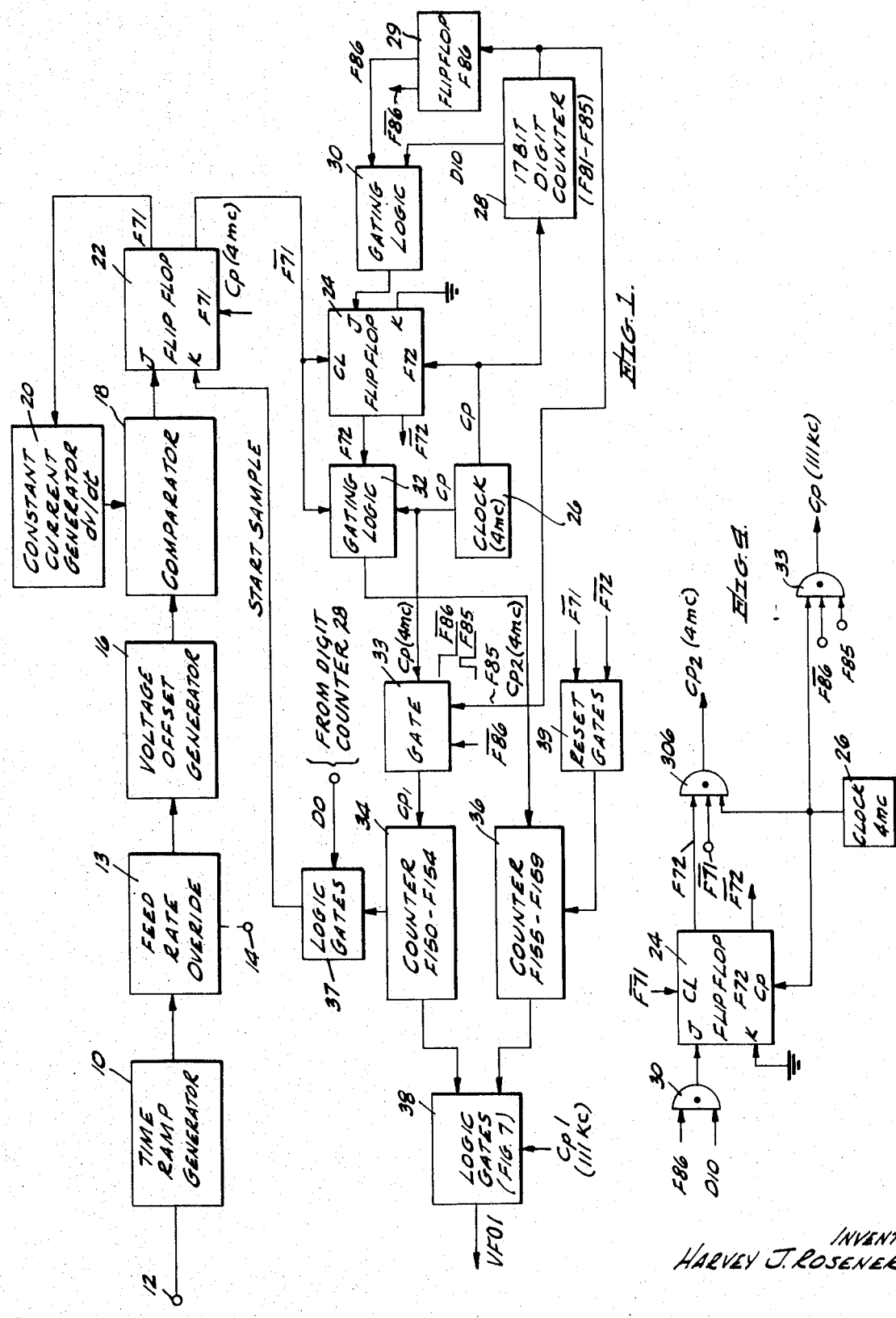

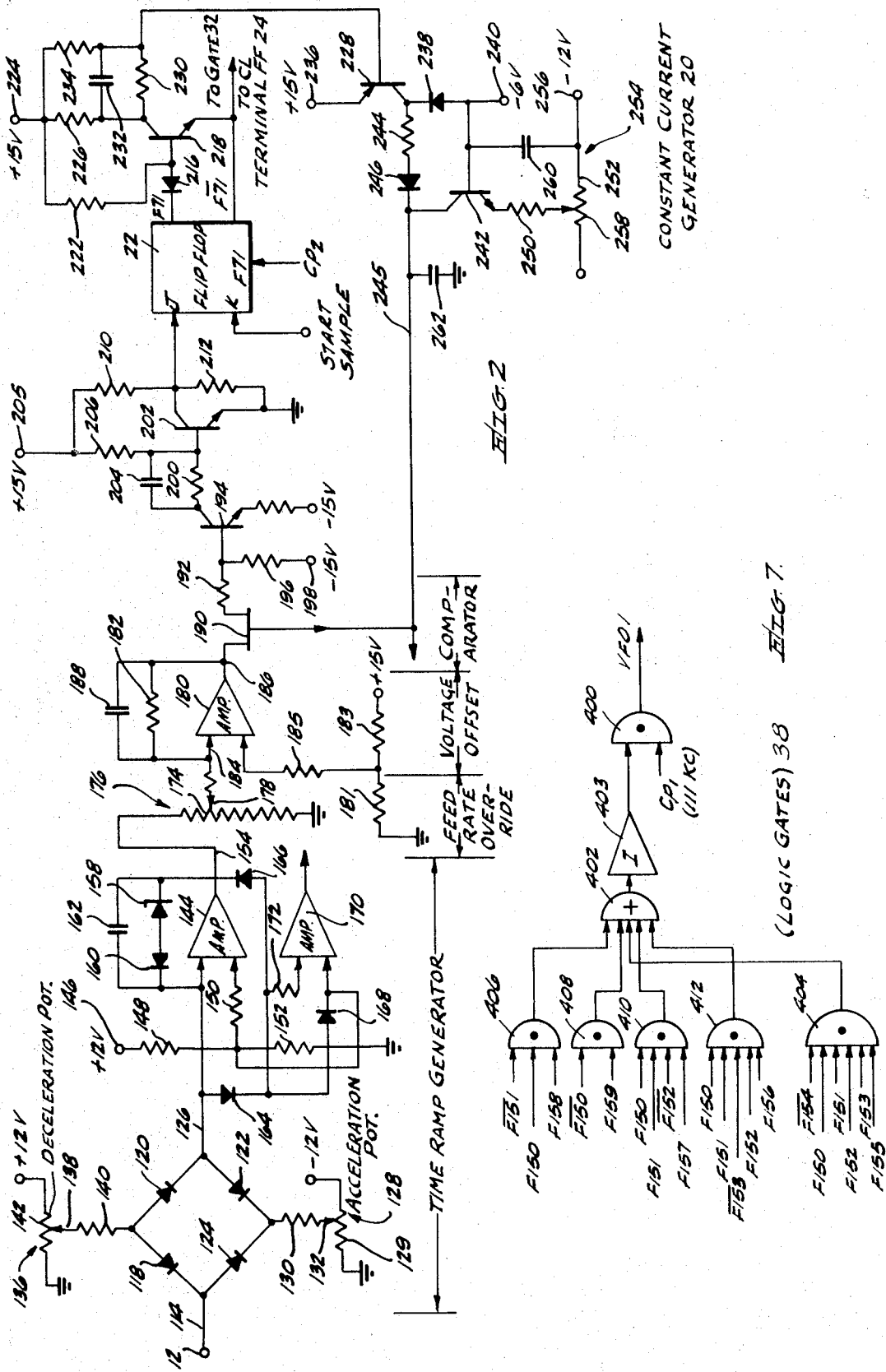

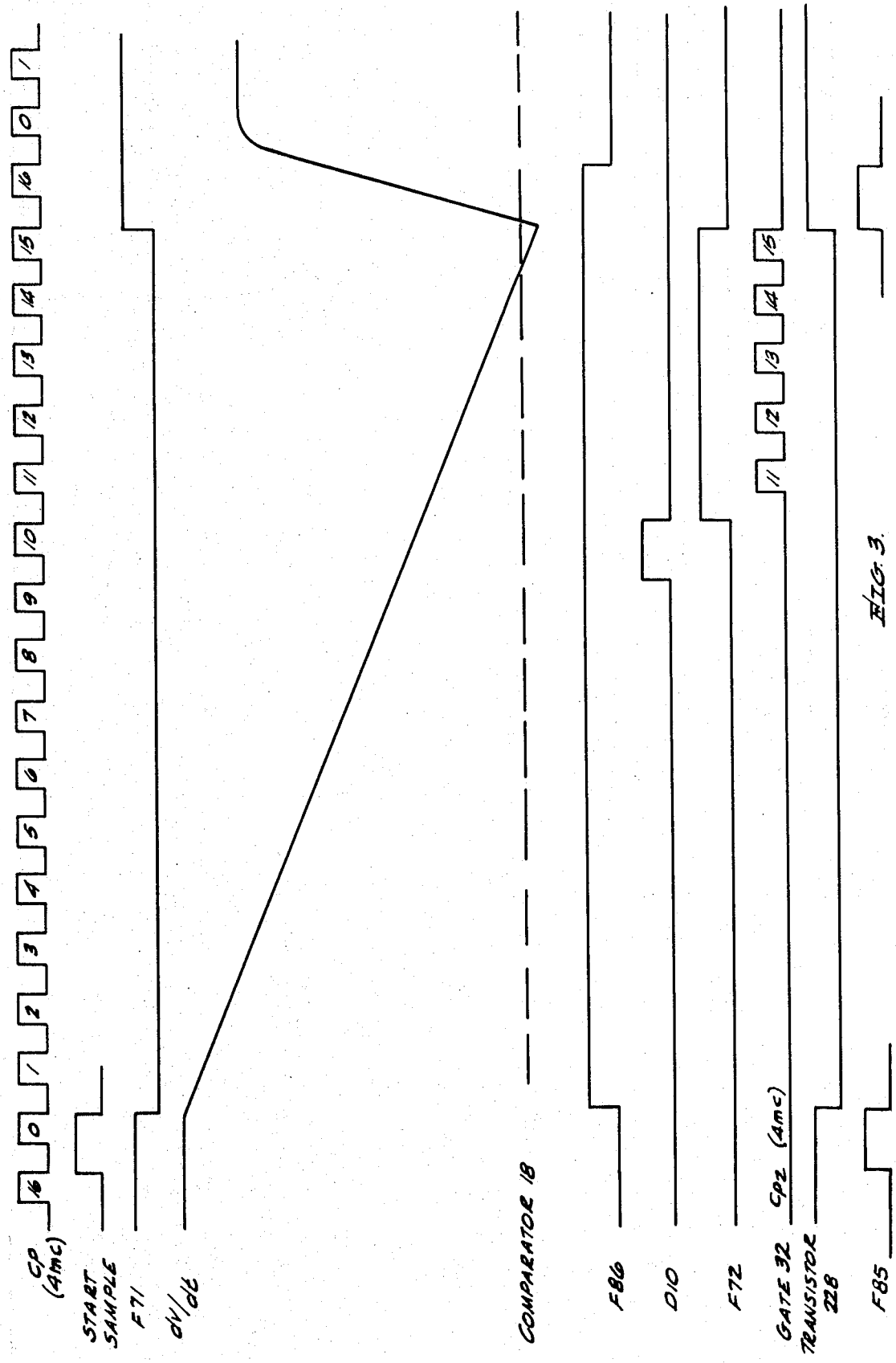

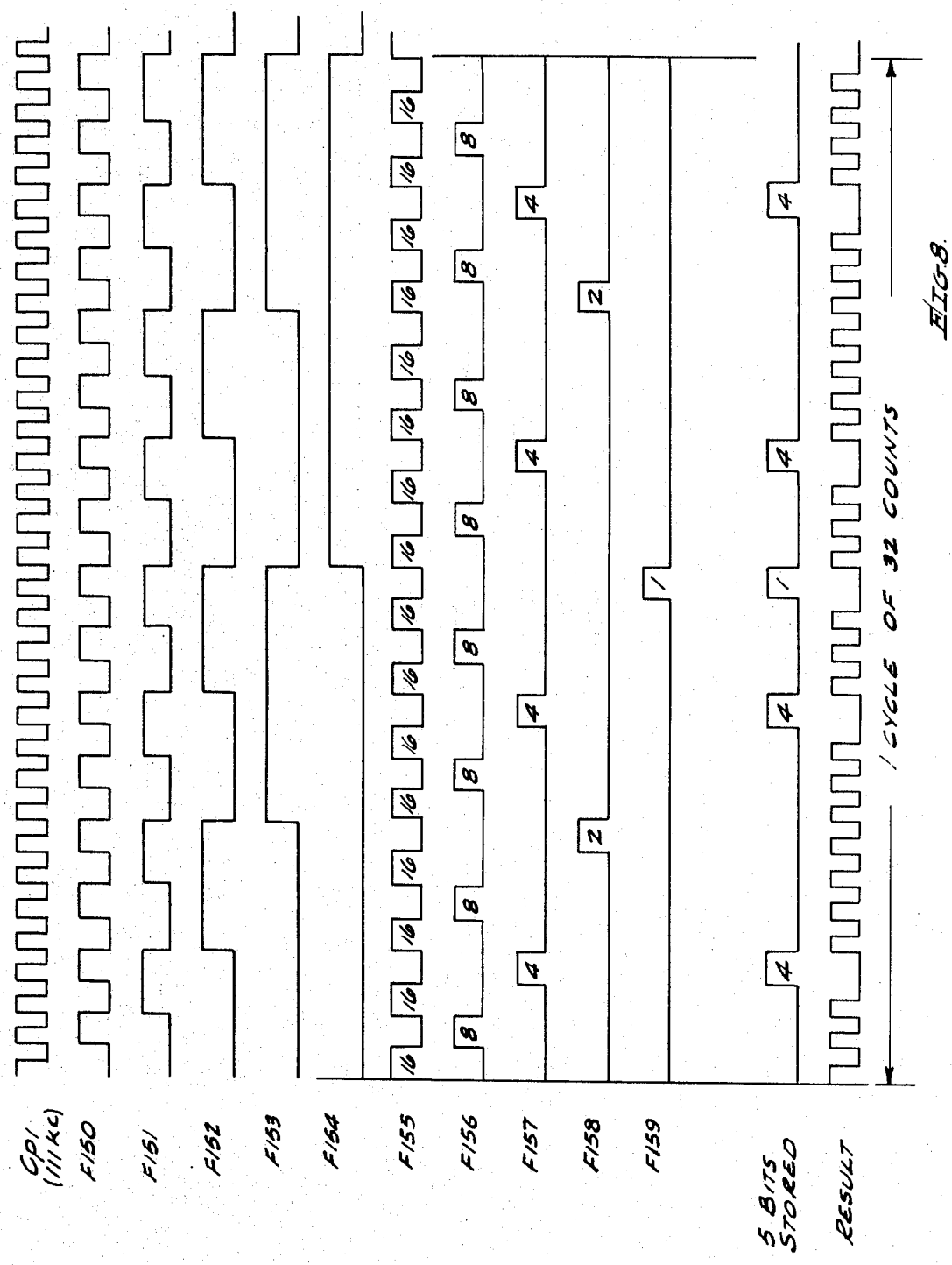

3,568,072

MACHINE TOOL CONTROL SYSTEM

BACKGROUND OF THE INVENTION

This invention relates to variable frequency oscillators and more particularly to a novel and improved variable frequency oscillator which operates with integrators for providing feed rate timing signals.

In machine tool control operation, and especially those types which perform contouring functions by use of numerical controlled computing devices, digital interpolators are use to perform linear and circular cutting functions. These computing devices include a number of integrators which are interconnected to produce the contouring functions in the form of electrical poles being applied to drive axes of the machine tool. Basic integrators in the prior art are well known.

These integrators use a pair of storage registers, each of which may be capable of holding a plurality of words which are incrementally added together through an adder on specific command pulses and stored in one of the two registers which is commonly referred to as the accumulator register.

The specific incremental times or reiteration times which provide the additions function to the adder is provided by a variable frequency oscillator or feed rate generator as described in this invention which receives its feed rate number from the numerical control tape system wherein the tape provides a number which is indicative of the velocity at which the machine tool moves. At certain times, acceleration or deceleration of this particular feed rate may be desired to be changed not withstanding the feed rate number provided by the tape. This particular situation arises when manual intervention is desired because it can be externally observed that the velocity at which the tool is moving is not a desirable rate. It may be either too slow or too fast, depending upon the desired operation.

The present invention provides a method to override the acceleration or deceleration of the cutting tool speed.

SUMMARY OF THE INVENTION

Briefly described, the present invention includes a voltage to time period converter which is responsive to an input signal on a sampled cycle. A timing ramp generator changes the input signal to voltage level with predetermined acceleration and deceleration signal ramps. A feed rate override means is provided to override the maximum input signal from the ramp generator. A voltage reference offset generator may be included to shift the zero reference to be compatible with further circuits and to act as an interface for a comparator. The comparator compares the input voltage from the offset generator with a linear decreasing voltage to time source which is enabled for a predetermined time by a detection circuit coupled to the output of the comparator. The output of the voltage to time period converter is coupled to a time period to pulse information converter which establishes information in the form of digital pulse which is a percentage of the total value of the input signal to the voltage to time period converter. The time period to pulse information converter includes logic circuitry enabled by detection circuit which samples the input voltage and loads a counter with clock pulses for the prescribed detection time. A second counter registers clock times at preselected intervals and resets the memory circuit for the next sample time. Further logic means is responsive to the counters and provides output signals which is a percentage of the input signal to determine changes in the feed rate and reiteration time to the adder of an associated integrator, for example. The further logic means deletes the pulses stored in the second counter register from the count stored in the first counter at preselected intervals.

It therefore becomes one object of this invention to provide a novel and improved feed rate override with minimum drift on its high input functions.

Another object of this invention is to provide a novel and improved variable frequency oscillator which includes manual intervention to the tape to override the fed rate provided thereto.

Another object of this invention is to provide a novel and improved variable frequency oscillator which has an analog-to-digital interface which represents the acceleration and deceleration function as well as being an override method of a given feed rate number.

Another object of this invention is to provide a novel and improved counting apparatus which provides for pulse deletion in a train of pulses at predetermined intervals.

These and other objects, features and advantages will become apparent to those skilled in the art when taken into consideration with the following detailed description wherein like reference numerals indicate like and corresponding parts throughout the several views and wherein:

FIG. lists a block diagram of the system of this invention;

FIG. 2 is an electrical schematic of one embodiment for performing the electrical functions in the block diagram shown in FIG. 1;

FIG. 3 is a timing diagram of various output signals of the system shown in FIGS. 1 and 2;

FIG. 4 is a logic schematic of other components used in connection with the system shown in FIG. 1;

FIGS. 5, 6 and 7 illustrate in block diagram form the nonintegral divider used to provide incremental outputs of this invention; and FIG. 8 is a graph illustrating timing diagrams for deleting pulses by the nonintegral counters shown in FIGS. 5, 6 and 7.

DESCRIPTION OF ONE PREFERRED EMBODIMENT

Figures 5, 6:
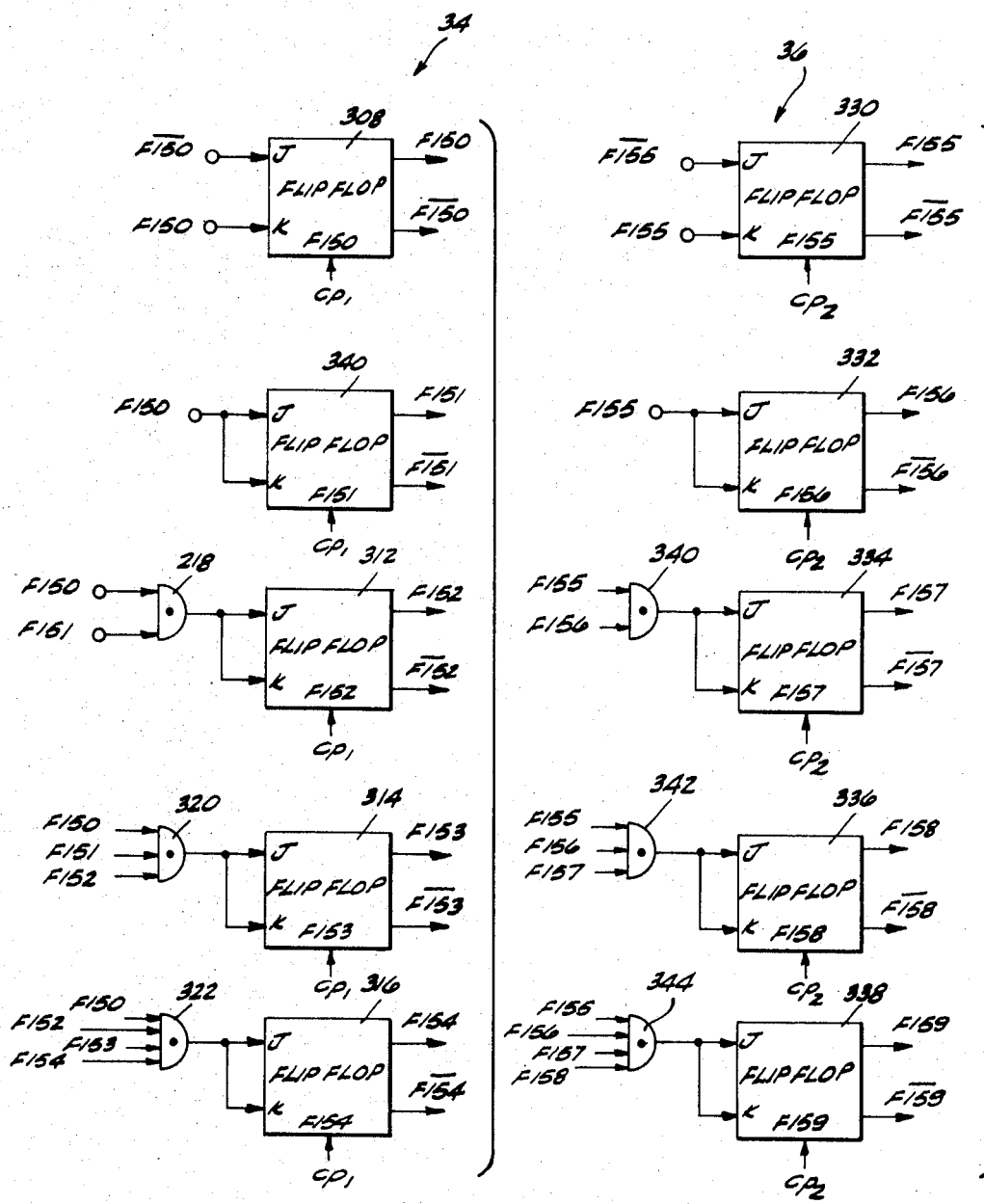

Turning now to FIG. 1, there is shown in block diagram form as one preferred embodiment of this invention, a voltage to time period converter comprising a time ramp generator 10 which receives input signals on the input terminal 12 thereof. The pulse width is determined by the length of movement of the machine. The time ramp generator 10 is calculated to turn on and off upon the input signals on terminal 12 and remain on during the cutting function provided through a machine tool control or the like. The time ramp of the output signal therefrom is dictated by the specific input on terminal 12 which stays off or on for a specific time. The time ramp generator 10 has an output circuit which is coupled to a feed rate override circuit 13 which may be in the form of a potentiometer or the like and will be explained in more detail as the description of this embodiment progresses.

The feed rate override circuit 13 has a manual adjustment provided thereto on the mechanical input linkage 14, as an example, and provides the feed rate override which will change the amplitude signal on the time ramp generator accordingly, and thus provide for speed reduction, as will be explained.

The input voltage applied to terminal 12 may swing +3 volts to 0. The output from the time ramp generator 10 may swing 0 to +12 volts. The feed rate signal applied to generator 10 is then overridden by the input 14 and provides an output to a voltage offset generator 16. The voltage offset generator 16 shifts the zero reference and acts as an interface for a comparator 18. The offset voltage generator shifts the voltage level in one preferred embodiment from 0 to +12 to −6 to +6. The output circuit of voltage offset generator 16 is then coupled into the input circuit of the comparator 18 where the voltage thereof is compared to a signal provided by the output circuit of a constant current generator 20. If there is a comparison between the two input voltages as shown in FIG. 3, and is provided to set a flip-flop 22. The flip-flop 22 is set for a predetermined time and for this embodiment is set for 15 bit times as shown in FIG. 3. The ramp slope $dv/dt$ is shown in FIG. 3 and when the comparator 18 reaches a level nearing the comparison point between the output of offset generator 16 and constant current generator 20 the output thereof returns to a predetermined voltage for the next sampled period.

The $\overline{F71}$ output circuit from the flip-flop 22 is coupled into the clear input circuit of a flip-flop 24. Flip-flop 24 will be reset by a START SAMPLE signal which may be provided by a logic gate 37 each time the contents of a counter 34 reaches a predetermined count and the output of a digit counter 28 is at a minimal count (DO), for example, zero. Flip-flop 24 is held in cleared condition in which its output is false when flip-flop 22 is in a set or true condition.

A clock pulse generator 26 provides clock pulses to the digit counter 28. The digit counter 28 may be capable of counting 17 bits with relation to the output of the clock pulse generator clock pulse generator output is denoted as CP as shown in FIG. 3. The gating logic circuit 30 is enabled when a count of 10 called bit 10 or digit 10 (D10) of counter 28 is reached, as shown in FIG. 3, which stays on for one clock pulse, and is also enable by an output pulse of a flip-flop 29 when the digit counter 28 reaches its maximum count of 17 bits, for example, as provided by a signal or pulse in a circuit F86 when the flip-flop 29 goes false or true i.e., changing electrical state. The true output circuit F72 of the flip-flop 24 and the output circuit CP of the clock pulse generator 26 is coupled into a gating logic circuit 32 which also receives input pulses from the flip-flop 22. The output circuit $CP_2$ of gating circuits 32 is denoted as $CP_2$ and is coupled to the input circuit of a counter 36. The signal in circuit $CP_2$ 2 stays on for 5 bit times, as set forth in this invention, and is defined by the following equation noted in Boolean algebra:

$$\overline{F71} \cdot F72 \cdot CP$$

which will be explained in more detail as the gating logic is described.

Note that the bit signal in circuit D10 of digit counter 28 having a capacity of 17 bits is gated with the F86 from flip-flop 29 by the gating circuit 30. Flip-flop 29 goes high (true) when the seventeenth clock pulse from clock 26 enters the counter 28 and causes it to change electrical state. The bit signal D10 goes true at the falling edge of clock pulse 09, thus the bit signal D10 is on for one clock pulse time. When the signal in circuit F86 is true and the bit signal D10 is present, flip-flop 24 goes true. The $dv/dt$ ramp is held at the highside of the voltage range until the flip-flop 22 goes false under the control of the start sample signal and then starts a negative $dv/dt$ ramp. When a predetermined relationship exists between he signal $dv/dt$ and the voltage reference offset signal from the voltage offset generator 16, the output of the comparator 18 triggers the flip-flop 22 which goes true on the falling edge of clock pulse 15. In its true or set electrical state the flip-flop 22 forces flip-flop 24 into a cleared or reset or false state by the clear pulse thereto via circuit $\overline{F71}$.

For each cycle of counter 34 that the pulse gate logic 32 provides no output, it can be said that the time ramp generator has a 100 percent output or the feed rate related to the axis is running at programmed speed. For each clock pulse that is provided into the divider counter 36, approximately 3-⅛ percent reduction is caused to the 100 percent output on the time ramp generator 10. For example, a gate pulse from gating logic 32 into counter 36 provides 31/32 of the total pulses, which is approximately 97 percent of the total pulse output, or 97 inches per minute, if the programmed rate is 100 inches per minute, for example. Gate pulse number 2 would leave 30/32 of the pulses or 93 inches per minute, for example, and can be reduced and, hence divided down by the number of inputs $CP_2$ to divider counter 36 until, for example, a reduction of 31 is made which gives an output of 1/32 of the input which will provide 3-⅛ inches per minute. Counter divider 36 is reset when signals $\overline{F71}$ and $\overline{F72}$ are present at the input circuits of a reset gate 39 which may be, for example, an AND gate having an $\overline{F71}$ pulse from flip-flop 22 and an $\overline{F72}$ pulse from flip-flop 24 applied thereto.

Turning now to FIG. 2, there is shown an electrical schematic flip-flop of a circuit network to control the acceleration and deceleration which are used to subsequently drive digital counters and other equipment, as will be explained. There will be provided a VFO pulse which feeds a feed rate generator to drive the interpolators used in connection with this invention. The VFO signal operates at a given frequency, and is further divided by a percentage thereof. The interpolator further divides the signal and initially lowers this frequency in an equivalent percentage thereof. A feed rate override is provided to cut back the feed rate if it is apparent to the operator that the machine tool is traveling at too fast a rate of sped.

An input terminal 12 receives a voltage level a zero volts or +3 volts and is connected by a lead 114 to a diode bridge 116 which comprises the diodes 118, 120, 122 and 124. The led 114 is coupled to the cathode of diode 118 and the anode 124 and an output lead 126 of diode bridge 116 is coupled between the cathode of diode 120 and the anode of diode 122. An acceleration potentiometer 128 having a resistive element 129 connected between −12 v. and ground has an adjustable tap coupled between the cathodes of diodes 124 and 122 by a resistor 130. A deceleration potentiometer 136 having a resistive element 142 coupled between +12 v. and ground has an adjustable tap 138 coupled through a resistor 140 to the anode of diodes 118 and 120. When the voltage level on terminal 12 is zero, diodes 118 and 122 conduct, disabling the potentiometer 136 and enabling potentiometer 128 to cause a current to flow therethrough to place output lead 126 at a negative level.

When the voltage level on terminal 12 is high or approximately up to +3 level, current passes through diodes 120 and 124 placing the output lead 126 at a high potential, thereby providing the appropriate voltage swing.

The output lead 126 is coupled directly into an operational amplifier 144 which may be for this embodiment the type manufactured by Fairchild Semiconductors and referred to as a Fairchild linear integrated circuit μ A709C which has specific characteristics well known to those skilled in the art. These particular operational amplifiers provide a low offset high input impedance with a large input common mode range and a high output swing under load and low power consumption. In this particular device, the output therefrom provides voltage equivalent to 100 percent to approximately 3 percent of the output on lead 154.

A second input is provided to operational amplifier 144 from a terminal 146 which provides a +12 voltage through a resistor 148 and resistor 150 through the input terminal thereof and the junction between the resistor 148 and the resistor 150 is coupled through a resistor 152 to a ground potential. Resistors 148, 150 and 152 provide a bias to the operational amplifier 144 and provide a reference level between ground and the +3 volts. The output lead 154 of the amplifier 144 is coupled back to the input lead 126 through a zener diode 158 and a diode 160 wherein the zener diode 158 has its anode coupled to the anode of diodes 160, and the cathode of zener diode 158 is coupled to the output lead 154 and the cathode of diode 160 is coupled to the input lead 126 of amplifier 144. Also, coupled in parallel with diode 160 and zener diode 158 is a capacitor 62.

The resistors 130 and 129 of the potentiometer 128 and the capacitor 162 dictates the time of the acceleration provided by potentiometer 128 or the change of rate of speed therefrom, and resistors 142, 140 and the capacitor 162 dictates the deceleration. Zener diode 158 provides a means of limiting the maximum voltage level of the output 154 and in this particular embodiment the voltage level is set at a +12 volts. Resistor 129 of potentiometer 128 determines the slope of acceleration on the output lead 154 and resistor 142 determines the slope of deceleration of the output thereof.

Lead 126 is coupled to the anode of diode 164 and the cathode thereof is coupled to the anode of diode 166 which has its cathode coupled to the lead 154. Also coupled to the cathode of diode 164 is the anode of diode 168 which has its cathode coupled as a first input circuit to an operational amplifier 170 (which may be of the Fairchild Semiconductor operational amplifier ** A710C). Also, the first input is connected to the junction of resistor 148 and 152. The other input circuit to amplifier 170 is coupled from the cathode of the diode 164 through a resistor 172. The diodes 164 and 166 establish the zero volts or the volt bottom level of swing of the output signal 154. Also, when the output signal on lead 154 is at the minimum level, the output of amplifier 170 is at +3 volts.

The output lead 154 of amplifier 144 is coupled to one end of the resistive element 174 of potentiometer 176 and the other end of the resistive element 174 is coupled to ground potential. An adjustable top 178 of this potentiometer is coupled to one input of an amplifier 180 which may be similar in structure and function in the same manner as the amplifier 144. Amplifier 180 has a resistive element 182 coupled between the input circuit 184 thereof and the output lead 186 and a capacitor 188 is shunted across resistor 182. Lead 186 is coupled to the source electrode of a field effect transistor 190 and the output and the drain electrode thereof is coupled through a resistor 192 to the base of transistor 194 and also through a resistor 196 to a terminal 198 which may have a −15 volts applied thereon.

The adjustable top 178 is operated by mechanical linkage 14 as shown in FIG. 1 and referred to as the feed rate override, which provides an intervention facility for overriding the feed rate voltage at any time. Amplifier 180 provides for level adjustment in impedance matching which provides that the output on lead 186 has its zero reference shifted wherein, for example, the output may have a maximum of +6 volts and a minimum of −6 volts. Capacitor 188 provides the lag network for stable operation and by dropping the frequency response to prevent oscillation and thereby making it insensitive to transient variations.

Resistor 182 provides a negative feedback in relation to the amplifier 180 while the resistive divider network 181 and 182 through resistor 183 provides the zero offset reference. Operation of the gate electrode of transistor 190 which periodically samples the final output of the circuitry to be described, will either be open or closed depending upon that output and will be described in more detail as description of the embodiment of this invention progresses.

The collector of a transistor 194 is coupled through a resistor 200 to the base of a transistor 202. A capacitor 204 is shunted across the resistor 200 which provides for faster turnoff of the transistor 202. The base of the transistor 202 is coupled through a resistor 206 to a terminal 205 which may have +15 volts applied thereto. The collector of the transistor 202 is coupled through a resistor 210 to the terminal 205. A resistor 212 is coupled across the emitter and collector of transistor 202 and applied as the J input to the flip-flop 22. The K input to the flip-flop 22 is enabled by a signal referred to as START SAMPLE and will emanate from circuitry hereinafter to be described. A pair of output circuits referred to as F71 and $\overline{F71}$ is provided from the flip-flop 22 where circuit F71 is coupled to the cathode of a diode 216 and the anode thereof is coupled to the base of transistor 218. The base of transistor 218 is also coupled to a terminal 224 through resistor 222 wherein terminal 224 may have +15 volts applied thereto.

The collector of the transistor 218 is coupled to the terminal 224 through a resistor 226. The collector of transistor 218 is also coupled to the base of a transistor 228 through a resistor 230 and the capacitor 232 wherein resistor 230 and capacitor 232 are coupled in parallel. The base of transistor 228 is also coupled to the terminal 224 through a resistor 234.

Transistor 228 has its emitter coupled to a terminal 236 which may have +15 volts applied thereto and has its collector coupled to the cathode of a clamping diode 238, the anode of which is coupled to a terminal 240 which may have −6 volts applied thereto. Terminal 240 is also coupled to the base 242. The collector of the transistor 228 is coupled in series with a resistor 244 and a diode 246 and the cathode of the diode 246 is coupled into the gate of the field effect transistor 190 through a circuit 245.

The emitter of transistor 242 is coupled through a resistor 250 to the adjustable top of an adjustable resistor 254, one end of which is coupled to a terminal 256 which may have −12 volts applied thereto. A capacitor 260 couples the base of transistor 242 to 12V transistor 242, diode 238, capacitor 260, and the adjustable resistor 254, provide a constant current source for the collector of the transistor 228. A capacitor 262 is coupled between the circuit 245 and ground potential. When the voltage level on the capacitor 262 goes below the source provided to source input circuit of field effect transistor 190 which is coupled to output lead 186 of amplifier 180, field effect transistor 190 begins to conduct and forces transistor 194 to conduct thereby backbiasing and cutting off transistor 202, thereby making its collector go to a +3 volts through resistors 210 and 22 and set flip-flop 22 and thereafter no output can be provided until a START SAMPLE pulse appears at the K input of flip-flop 212 and resets it.

When the input to terminal 12 goes to ground, a ramp signal is generated from operational amplifier 144 of the timing factor as previously described and set by the potentiometer 128 and the up slope thereof is determined by the acceleration potentiometer 128. Thereafter, as previously discussed, the output of operational amplifier on lead 154 has its zero reference shifted so that the voltage swing is +6 volts to −6 volts and feeds it into the field effect transistor 190. The output of amplifier 170 provides a safe velocity measure which indicates when the signal on lead 154 is low or that the VFO signal on the output of logic gating 38 is approximately 3 percent of its maximum.

When a START SAMPLE pulse is received from gate 37, the flip-flop 22 is reset provided an appropriate clock pulse is provided which is referred to as $CP_2$ and will be explained in more detail with reference to FIG. 2. When a pulse appears on circuit F71, transistor 218 is turned off. Transistor 228 is also turned off, which in turn then enables a ramp signal which turns on field effect transistor 190. Resistors 250 and 252 and capacitor 262 determines ramp timing. The setting of the top of potentiometer 176 determines the time of the ramp to b monitored when the field effect transistor 190 is turned on. If the field effect transistor 190 is on, the transistor 194 is in turn turned on, which in turn cuts off transistor 202 and sets flip-flop 214.

With reference now to FIG. 4, the circuits are shown which produce the clock pulse $CP_2$ and the clock pulse $CP_1$. To generate the clock pulse $CP_2$ the flip-flop 24 has its J input coupled to the output of the AND gate 30 which is enabled by signals on the circuits F86 and D10. The circuit F86 receives a voltage state signal which is on for 17 bit word and cycle of the counter 28 off for the next 17 bit word cycle and the circuit D10 receives voltage state signal which indicates the tenth bit of the 17 bit counter 28 as shown in FIG. 1, hereinafter to be explained.

The forced reset condition on flip-flop 24 is removed by its input being forced high by $\overline{F71}$ signal. The flip-flop 24 provides a pair of output pulses on circuits denoted as $\overline{F72}$ and F72, wherein the signal in the circuits F72 is applied to an input circuit of the AND gate 34 receive clock pulses $CP_1$ at about 111 kilocycles from the AND gate 33 when it is clock pulse generator 26, which may be 4 megacycles, for example, and an $\overline{F71}$ signal which emanates from the false output of the flip-flop 22. The output of AND gate 32 provides the clock pulses $CP_2$ used to clock subsequent counting circuits to be described.

With reference now to FIG. 5, there is shown a bank of flip-flops 308 to 316 denoted as F150 to F154, respectively, which form the counter 34. Flip-flop 308 provides a pair of output pulses F150 and $\overline{F150}$, having its J input set by an $\overline{F150}$ pulse and its K input enabled by an $\overline{F150}$ pulse. Each setting and resetting of the flip-flops used herein requires requires a clock pulse $CP_1$ from AND gate 33 with inputs F86, F85 and clock generator 304, shown in FIG. 4, before the flip-flop will change states. F151 flip-flop 310 provides the output pulses termed F151 and $\overline{F151}$ and is enabled on its J and K inputs, simultaneously, by an F150 pulse from flip-flop 308. F152 flip-flop 312 provides the output pulses termed F152 and F152 and both of its J and K inputs are enabled by the output pulse of an AND gate 318 wherein AND gate 318 is enabled by an F150 pulse from flip-flop 308 and an F151 pulse from flip-flop 310. F153 flip-flop 314 provides a pair of output pulses termed F153 and $\overline{F153}$ wherein the J and K inputs thereto are simultaneously enabled by an output pulse of an AND gate 320 wherein AND gate 320 is enabled by an F150 pulse, F151 pulse and an F152 pulse from flip-flops 308, 310 ad 312, respectively. F154 flip-flop 316 provides a pair of output pulses termed F154 and $\overline{F154}$ and has its J and K inputs simultaneously enabled by the output pulse of AND gate 322 wherein AND gate 322 is enabled by an F150, an F151, an F152 and an F153 pulse from flip-flops 308, 310, 312 and 314 respectively. Each of the flip-flops 308 to 316 mentioned in the counter 34 receive clock pulses $CP_1$ at about 111 kilocycles from the AND gate 33 when it is enabled by an input signals $\overline{F86}$, F85 to gate a clock pulse CP from the 4 mc. clock generator 26 of FIG. 4.

With reference now to FIG. 6, there is shown a bank of flip-flops 330 to 338 which form a counting circuit 339 wherein F155 flip-flop 330 provides a pair of output pulses termed its J and $\overline{F155}$ and has its J input enabled by an $\overline{F155}$ pulse and its K input enabled by an F155 pulse. F156 flip-flop 332 provides a pair of output pulses termed F156 and $\overline{F156}$ and has its J and K inputs simultaneously enabled by an F155 pulse from flip-flop 330. F157 flip-flop 334 provides a pair of output pulses F157 and $\overline{F157}$ and has its J and K inputs simultaneously enabled by the output pulse provided by an AND gate 340, where an AND gate 340 is enabled by an F155 pulse and an F156 pulse from flip-flop 330 and 332, respectively. F158 flip-flop provides a pair of output pulses F158 and $\overline{F158}$ and has its J and K inputs simultaneously enabled by the output pulse of an AND gate 342 wherein AND gate 342 is enabled by an F155 pulse, an F156 pulse, an F157 pulse from flip-flops 330, 332 and 334, respectively. F159 flip-flop 338 provides a pair of output pulses F159 and $\overline{F159}$ and has its J and K inputs simultaneously enabled by the output pulse of an AND gate 344 wherein AND gate 344 is enabled by F155 pulse, F156 pulse, F157 pulse and an F158 pulse from flip-flops 330, 332, 334 and 336, respectively. The flip-flops 330 to 338 forming the counter 339 are also enabled by CP pulse provided by AND gate 32 as previously described in connection with FIG. 4.

Referring now to FIG. 7, there is shown in logic diagram form, a logic gate 38 which can be expressed to function as set forth in Boolean algebra notations as follows:

$$[(\overline{F151} \cdot F150 \cdot F158) + (\overline{F150} \cdot F159) + (F150 \cdot F151 \cdot \overline{F152} \cdot F157) + (F151 \cdot F150 \cdot \overline{F152} \cdot \overline{F153} \cdot F156) + (F150 \cdot F151 \cdot F152 \cdot F153 \cdot \overline{F154} \cdot F155)].CP2 = VFO1$$

The above equation can be denoted with reference to the logic circuit diagram in FIG. 7. An AND gate 400 receives an inverted input from OR gate 402 through an inverter 403 and an input from AND gate 404, and a CP2 input as generated by the logic circuit shown in FIG. 4. OR gate 402 is enable by the outputs of AND gates 404, 406, 408, 410, and 412 wherein AND gate 406 is enabled by an F150 and an $\overline{F151}$ from counter 34 or an F158 from the counter 36 shown in FIGS. 5 and 6. AM AND gate 408 is enabled by a pulse $\overline{F150}$ and an F159 pulse from the counters 34 and 36 respectively. AND gate 410 is enabled by an F150 pulse, an F151 pulse and an $\overline{F152}$ pulse from the counter 34 or an F157 pulse from counter 36. AND gate 412 is enabled by an F150 pulse, an F151 pulse, an F152 pulse and an $\overline{F153}$ pulse from counter 34 or an F156 pulse from counter 36. AND gate 404 receives an $\overline{F154}$ pulse, an F150 pulse, an F151 pulse, an F152 pulse and an F153 pulse from counter 34 or an F155 pulse from counter 36. Thus the logically derived combination of pulses from the counters as enabled by the time ramp generator and logic circuitry as shown in FIG. 1 provide the output signals to change speed of the machine tool movement as set forth in the Graph of FIG. 3 as set forth in counts 11—16 therein by applying blocking or deleting pulses to delete pulses from the train of CP1 pulses.

Reviewing the circuit as shown in FIG. 1, and in conjunction with the logic circuit shown in the other adjacent circuitry, there has been provided a voltage-to-time period converter which converts a voltage level on the input terminal 12 which is in the form of a pulse having a predetermined width to coincide with the desired cutting time for the associated machine tool and wherein the amplitude thereof represents the speed of the desired cut. The initial input signal is then converted to a voltage signal which has time ramp slopes at the outset for acceleration of the machine to prevent the sudden start-stop effect of the machine tool which is determined by the time ramp generator 10 and further explained in connection with the circuit diagram of FIG. 2. Acceleration and deceleration slopes of the input feed signal can be changed by adjustment of potentiometers 128 and 136, for example, on the acceleration and deceleration inputs to the time ramp generator 10.

To change the feed rate value of the input signal, manual adjustment on the input 14, as shown in FIG. 1, as a mechanical linkage and implemented by the potentiometer 174, shown in FIG. 2, the amplitude of the input signal is adjusted according to the desired rate of speed. This signal is then applied to a comparator which compares the signal with a constant current source creating a $dv/dt$ which is clamped to a specific voltage in the constant current generator 20. When the original modified input signal is equal to or less than the signal from the constant current source, a detection circuit in the form of a flip-flop 22 provides a feedback for a predetermined time to sample the specific signal voltage level as determined by the $dv/dt$ and provides output signals in the form of voltage state signal $\overline{F71}$ to a time period to voltage pulse converter which provides voltage outputs for a preselected interval determined by the number of clock pulses determined by F72, $\overline{F71}$ and CP.

A first counting circuit 36 is on for a predetermined time as dictated by the time-to-pulse converter wherein each clock pulse for this specific example may represent 3.125 percent decrease and providing therefrom predetermined increments of changes in the feed rate on the output through the logic gates 38. A second counting means, in the form of counter 34, is the a free running counter which is determined by the output signal of the digit counter 28 which can be alternating flip-flop 29 which provides the F86 signal and is incremented every two 17 bit digit words as dictated by counter 28. After each counting time provided by counter 34, logic gate 37 initiates produces a start signal sample signal into the detection circuit in the form of flip-flop 22 and a second sample taken of the input signal on terminal 12 to decide whether further changes are to be made in logic gates 38 to provide a change in the feed rate speed.

Considering that the gate 33 reduces the clock 26 by a specific amount, for example, if the clock 26 is running at 4 mc. and the 17 bit digit counter and the F86 term gated therewith, the output might provide a clock pulse CP1 which is running at approximately 111 kc. Thus, with reference to FIG. 8, CP1 as shown therein can be considered 111 kc pulses. In operation with a machine tool control and the interpolator used therein, a reiteration of the interpolator is provided on each clock pulse thereof. Thus it can be said that 111 kc would be the 100 percent movement as previously described. The output of the gate 33 causes counter 34 to be free running in that the output therefrom is coupled to the logic gate 38 and should counter 36 be empty, that is, hold no count as determined by the previously described logic circuitry, then the output of logic gate 38 would be at the 111 kc. Should, on the other hand, the counter 36 contain the 5 digit pulses as shown from the output of gate 32 as shown in the circuit drawing of FIG. 4, then by this process 5 digit pulses would be deleted from the 32 pulses in counter 34 as shown in FIG. 8.

With reference to FIG. 8, note that the pulses which are labeled with a 16 therein would, if ANDed with the CP1 in logic gates 38, provide output pulses during a particular cycle which would be exactly 50 percent of the amount of pulses in the original 111 kc clock CP1. This would happen if a count of 16 were stored in counter 36. If, on the other and, a count of 8, 4, 2 or 1 as shown were stored in counter 36, pulses at these particular time periods would be deleted from CP1.

In the example shown in FIG. 3 where 5 clock pulses are stored, the FIG. 8 shows a deletion where 4 pulses and 4 pulse equal the 5 pulses deleted in a specific time, and a resultant is the clock pulse CP1 running at 111 kc with the exception that selected pulses CP1 are deleted at specific intervals. The resultant figure shown in FIG. 8 provides 27 pulses during the complete cycle and thus the output to the machine tool would run at a slower speed by the fact that certain reiteration pulses are deleted therefrom.

I claim:

1. In a control system:
   a first means for providing information to impart machine movement at a programmed rate;
   a second means coupled to said first means for providing rate changes of the movement in the machine axis;
   a first counter for receiving a predetermined number of pulses indicative of the information provided by said first means;
   a second counter for receiving a number of pulses indicative of the rate change provided by said second means; and
   means for deleting the number of pulses in said second counter from the contents of said first counter at predetermined intervals, said means being coupled to said first and said second counters.

2. A machine tool control system for providing manual intervention override means to change a programmed rate of change comprising:
   a time ramp generator having an input circuit and an output circuit, means coupled to said input circuit for providing timing signals to said time ramp generator;
   a feed rate override means for providing signal changes, said feed rate override means having an input circuit coupled to the output circuit of said time ramp generator;
   a voltage offset generator having an input circuit coupled to the output circuit of said feed rate override and having an output circuit, said voltage offset generator including means for providing a change of zero reference of the signal provided to the input means of said time ramp generator;
   a comparator, said comparator having a first input circuit coupled to the output circuit of said voltage offset generator and a second input circuit and having an output circuit;
   a flip-flop, said flip-flop having a first input coupled to the output of said comparator and a second input, said flip-flop having a first output circuit and a second output circuit;
   a constant current generator having an output circuit coupled to the second input circuit of said comparator and an input circuit coupled to the first output circuit of said flip-flop;
   logic means enabled by said second output circuit of said flip-flop and providing output signals for a predetermined time, said logic le means including a digit counter capable of providing output signals indicative of the programmed input and further including a clock circuit which provides clock signals at the rate of the programmed input; and
   counting circuits enabled by said logic means and providing a first output to the second input circuit of said flip-flop and a second output circuit for providing output signals dictated by the output of said feed rate override means.

3. The control system as defined in claim 2 and wherein said counting circuits comprise:
   a first binary counter responsive to the programmed input signals of said logic means;
   a second binary counter being responsive to the output signal of predetermined times of said logic means; and
   further logic means being coupled to said first and said second binary counters for deleting the contents of said first counter from said second counter at predetermined intervals.

4. In a machine tool control system:
   means for providing an information signal having a voltage level of a predetermined amplitude;
   a voltage-to-time period converter;
   a time period-to-pulse information converter responsive to said voltage-to-time period converter;
   means coupled to said time period-to-pulse information converter for sampling the pulses provided thereby;
   logic means coupled to said sampling means for determining a voltage level of a different amplitude;
   a first counter for receiving the pulses indicative of the information signal of said first means;
   a second counter for receiving the sampled pulse of said second means;
   and means for deleting the number of sampled pulses of said second means from the contents of said second counter.

5. The control system as defined in claim 4 wherein said voltage to time period converter includes:
   a time ramp generator being responsive to said first named means for generating a signal at predetermined times in relation thereto and having a determinable rise and fall time;
   an override circuit coupled to said time ramp generator and including a control to vary the voltage level of the signals;
   a feedback network including a constant current source;
   a comparator being responsive to said time ramp generator and said feedback network; and
   a detector circuit being coupled to said feedback network and responsive to said comparator.

6. The control system as defined in claim 4 wherein said voltage to time period converter comprises:
   a time ramp generator being responsive to said first named means for generating a signal at a predetermined time in relation thereto and having a determinable rise and fall time;
   an override circuit coupled to said time ramp generator and including a control means for varying the voltage level of the signals;
   a feedback network including a constant current source;
   a comparator being responsive to said time ramp generator and said feedback network;
   a first detection circuit being coupled to said feedback network and responsive to said comparator and wherein said time period to pulse information converter comprises;
   a clock pulse generator;
   a second detection circuit being responsive to signals from said clock pulse generator and said voltage to time converter; and
   logic means coupled to said clock pulse generator and said second detection circuit for providing output pulses indicative of the time period provided by the information signal of said first named means.

7. A machine tool control system having a feed rate generator comprising:
   a signal source having an output circuit;
   a time ramp generator having an input circuit coupled to said output circuit of said signal source and having an output circuit;
   a constant signal source having an input circuit and having an output circuit;
   a comparator having a first input circuit coupled to said output circuit of said time ram generator and having a second input circuit coupled to the output circuit of said constant signal source;
   a detector circuit having an input circuit coupled to said output circuit of said comparator and having an output circuit coupled to said input circuit of said constant current source;

a divider network responsive to said detector circuit and having a first counting circuit and a second counting circuit, said first counting circuit being coupled to said comparator and said second counting circuit being coupled to said detector circuit; and a gating circuit coupled to and controlled by said first counter and said second counter for producing an output pulse train indicative of feed rate.